United States Patent [19]

Jones et al.

[11] Patent Number: 4,706,502

[45] Date of Patent: Nov. 17, 1987

[54] VORTEX SHEDDING FLOWMETER

[75] Inventors: Julian D. C. Jones, Sittingbourne; David A. Jackson; Pedram A. Leilabady, both of Canterbury, all of England

[73] Assignee: Kent Scientific and Industrial Projects Limited, Canter, England

[21] Appl. No.: 841,527

[22] PCT Filed: Jul. 5, 1985

[86] PCT No.: PCT/GB85/00302

§ 371 Date: Feb. 27, 1986

§ 102(e) Date: Feb. 27, 1986

[87] PCT Pub. No.: WO86/00698

PCT Pub. Date: Jan. 30, 1986

[30] Foreign Application Priority Data

Jul. 6, 1984 [GB] United Kingdom ............... 8417367

[51] Int. Cl.⁴ .............................................. G01F 1/32
[52] U.S. Cl. .................................. 73/861.24; 250/227
[58] Field of Search ............... 73/861.22, 861.24, 653, 73/657; 250/227; 356/345, 352

[56] References Cited

U.S. PATENT DOCUMENTS

| 4,416,159 | 11/1983 | Williamson et al. | 73/861.22 |
| 4,530,603 | 7/1985 | Shaw et al. | 73/657 X |
| 4,534,222 | 8/1985 | Finch | 73/653 |
| 4,613,752 | 9/1986 | Davis | 356/345 X |

FOREIGN PATENT DOCUMENTS

| 0191923 | 11/1983 | Japan | 73/861.22 |
| 1544636 | 4/1979 | United Kingdom | 73/861.24 |

OTHER PUBLICATIONS

Bucaro et al, "Acoustic-Optic Sensor Development", in Conf. IEEE Electronics & Aerospace Systems, pp. 572-580, 10/79.

Lyle et al, "Vortex Shedding Fluid Flowmeter Using Optical Fiber Sensor", in Electronics Letters, 3/81, vol. 17, #6, pp. 244-245.

Primary Examiner—Herbert Goldstein
Attorney, Agent, or Firm—Bell, Seltzer, Park & Gibson

[57] ABSTRACT

A flowmeter for measuring the velocity of fluid flow by monitoring the vortex shedding frequency of the fluid flow comprises a single mode optical fiber sensing element (1) for detecting vortex shedding and utilizes interferometric techniques for producing an electrical output signal corresponding to the vortex shedding frequency. The sensing element (1) comprises at least part of the signal arm (2) of an interferometer (3) which also includes means (12) for deriving a reference signal from the illuminating light source (4). The flow induced oscillation of the sensing element (1) caused by vortex shedding produces modulations of the interferometer output which is monitored by a photodetector (14) which, in turn, produces a modulated electrical output signal which can be processed by a signal processing system (16-19) to identify the vortex shedding frequency and, hence, produce a measurement of the flow velocity.

9 Claims, 8 Drawing Figures

Fig.5A HIGH TENSION

Fig.5B MEDIUM TENSION

Fig.5C LOW TENSION

VORTEX SHEDDING FLOWMETER

BACKGROUND OF THE INVENTION

The present invention relates to a flowmeter for measuring the velocity of flow of a fluid, such as, a liquid, gas or vapour phase, by detecting the vortex shedding frequency of the fluid flow and, more particularly, to such a flowmeter which utilises a fibre optic sensing element to detect vortex shedding.

Flow rate measurement based on the natural phenomenon of vortex shedding is known and has been realised using a variety of techniques for monitoring the vortex shedding frequency. When a bluff (that is, non-streamlined) body is sited in a fluid flow, it will, under certain conditions, cause a regular stream of vortices to form in the fluid downstream of the body. These vortices leave alternately from opposite sides of the body. Moreover, as each vortex is generated and shed, it produces a lateral force on the body and, if the body is sufficiently flexible, it will oscillate.

The pattern of flow past the bluff body is governed by the Reynolds number (Re). The transition from a steady laminar flow to an unsteady turbulent flow occurs at $Re \sim 40$. For $Re > 40$ wakes appear behind the body and eddies are formed. When Re exceeds 100, the boundary layer separates and the eddies are shed alternately from opposite sides of the body, resulting in the Karman vortex sheet. This vortex shedding occurs with a regular periodicity in the turbulent flow region, except in the transition regions when $200 < Re < 400$ and $3 \times 10^5 < Re < 3 \times 10^6$. This breakdown is mainly due to transition from a laminar to a turbulent boundary layer state.

The vortex shedding frequency f is related to the flow velocity v by the equation $$f = sv/d$$

where s is the Strouhal number and d is the diameter of a cylindrical bluff body. Generally s is a function of the Reynolds number, and the study of the flow velocity dependence of s is an established branch of research in hydrodynamic studies. For large values of Re the turbulence of the vortices has a stabilising effect on the value of s and it is effectively constant. Hence, the flow velocity may be directly determined from a measurement of the vortex shedding frequency.

The linearity and wide dynamic range of the vortex shedding process have been exploited in a number of commercial flowmeter designs. Vortex shedding detection techniques include temperature, pressure and strain sensing, with the sensing element either being sited on the bluff body or being disposed down the vortex sheet. Also, a flowmeter of this type has been proposed which uses a multimode optical fibre sensing element, as the bluff body, and in which the oscillating strain induced in the fibre sensing element, as a result of the vortex shedding effect, is detected by the fibredyne technique. This proposal is described in the publication "Electronics Letters" of Mar. 19, 1981 at page 244. The fibredyne technique suffers from random fading and the generation of large numbers of harmonics of the fundamental pertubation. Whilst the technique adequately determines the vortex shedding frequency, it shows the harmonics of the fundamental frequency in the output spectrum and does not give the absolute amplitude of the strain.

SUMMARY OF THE INVENTION

It is an object of the present invention to avoid the problems experienced with the previously proposed arrangement of fibre optic vortex shedding flowmeter and to provide such a flowmeter having a single mode optical fibre sensing element and utilising interferometric monitoring techniques.

To this end, the invention consists in a flowmeter for monitoring the vortex shedding frequency of a fluid flow, comprising a tensioned optical fibre sensing element arranged to extend transversely to the fluid flow so as to oscillate in response to vortex shedding, a light source for illuminating the optical fibre, and a photodetector for sensing the interference pattern at an output of the fibre sensing element and producing an electrical signal corresponding to the vortex shedding frequency, characterised in that the sensing element comprises at least part of a single mode optical fibre forming the signal arm of an interferometer which also includes means for deriving a reference signal from the illuminating light source, said interferometer producing an interference signal which corresponds to the optical phase difference between the signal light beam and the reference signal and which is modulated by oscillation of the sensing element in response to vortex shedding, and said photodetector being arranged to sense the interference signal and produce an electrical signal having a modulation frequency corresponding to the vortex shedding frequency.

With the invention, the sensing element part of the monomode optical fibre signal arm may be stretched across a flow tube or passage such that the process of vortex shedding induces an oscillating strain in the sensing element which vibrates in alternate directions normal to its axis. The strain is detected by monitoring the interferometer irradiance using the photodetector, the output of which may be processed to produce an electrical signal identifying the vortex shedding frequency and, hence, the flow velocity. Signal processing means for optical fibre interferometers are known which are capable of recovering from the electrical output signals of the photodetector, the absolute strain-induced phase changes with extreme sensitivity and over a wide dynamic range.

In one embodiment, the interferometer of the flowmeter has a Fabry-Perot configuration. It is formed between the normally cleaved input and distal faces of the single mode optical fibre, the length of which is selected so that the visibility of the interference fringes is maximised. The interferometer is used in reflection and the output irradiance is monitored by the photodetector. The vortex shedding frequency is determined from the modulation frequency of the photodetector output and is derived from a counting system which registers the number of positive or negative-going transitions through an adjustable discriminator level. The number of counts registered per fibre oscillation is a function of the flow velocity, fibre tension and equilibrium operating point of the interferometer. By using data acquisition times of a few seconds, thermal effects causing random drifts of the interferometer operating point may be averaged. The velocity dependence may be determined by calibration experiments. The calibration is highly reproducible and stable and permits the determination of the flow velocity over a wide range of fibre Reynolds number.

The time-averaging technique is used to alleviate inaccuracies which might otherwise be caused by the environmentally induced drift in the interferometer operating point. This technique in turn limits the response time of the flowmeter. Alternatively, an active homodyne signal processing system may be employed which maintains the interferometer at a constant operating point, conveniently, in quadrature. Such a processing system is capable of detecting much smaller phase changes, so extending the dynamic range of the flowmeter. It is equally applicable to flowmeters according to the invention embodying a Fabry-Perot, Michelson, Mach-Zehnder or Polarimetric interferometer

BRIEF DESCRIPTION OF THE DRAWINGS

In order that the present invention may be more readily understood, reference will now be made to the accompanying drawings, in which.

DESCRIPTION OF THE PREFERRED EMBODIMENTS

Figure 1:
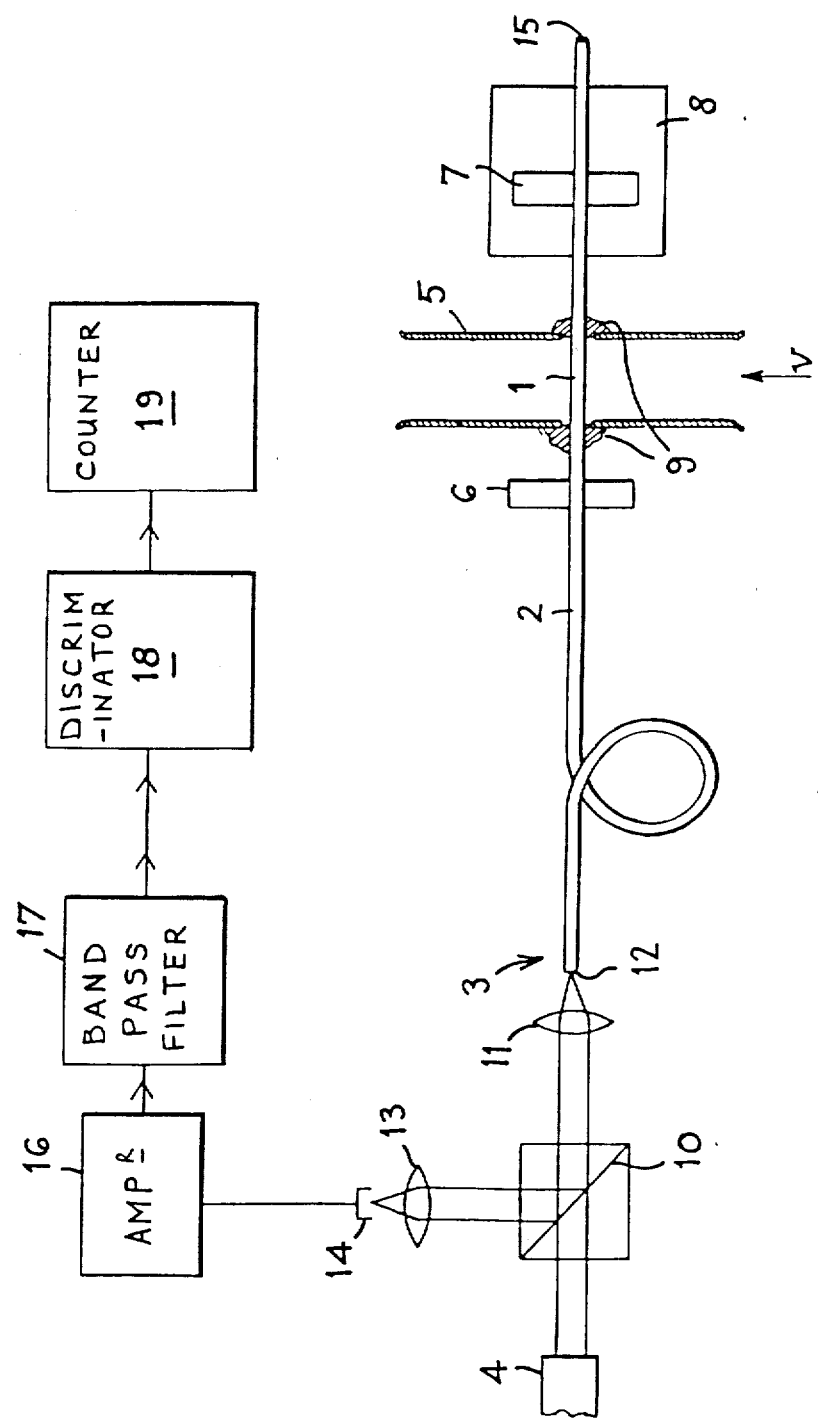
FIG. 1 diagrammatically illustrates one embodiment of the invention based on a Fabry-Perot interferometer.

Referring to FIG. 1 of the drawings, the flowmeter comprises a sensing element 1 which is part of a single mode optical fibre 2 forming the signal arm of a Fabry-Perot interferometer 3. The latter is formed between the normally cleaved input and distal ends 12,15 of the fibre and is illuminated by a coherent light source 4, for example, a 0.5 mW multi-mode helium-neon laser. The fibre sensing element 1 is disposed diametrically across a flow tube 5 for fluid, the flow rate of which is to be measured. It is mounted between two clamps 6,7 and is tensioned by a tensioning element 8 supporting the clamp 7. It is sealed in the openings via which it extends through the flow tube 5 by flexible filler material 9.

Light from the coherent source 4 is launched into the optical fibre 2 via a beam splitter 10 and a collimating lens 11 which focusses the light beam onto the input end 12 of the fibre. The latter is reflective and a fraction of the incident light is reflected from the end face 12 as a reference beam. The latter is collimated by the lens 11 and is reflected by the beam splitter 10, via a second collimating lens 13, onto a photodiode detector 14. The fraction of the input beam propagated within the fibre 2 is guided to the distal end 15, which is silvered so as to reflect the beam back through the fiber. The returning signal beam, similarly to the reference beam, is collimated by the lens 11 and is reflected by the beam splitter 10, via the lens 13, onto the photodiode 14. It mixes coherently with the reference light beams reflected from the input end face 12 of the optical fibre 2 to produce an interference signal. The photodiode detects this interference signal and produces an electrical current output I which is of the form $I_0 (1+\cos \phi)$, where $\phi$ corresponds to the optical phase delay between the reference and signal light beams introduced by passage of the latter through the fibre 2. As is hereinafter more fully described, this photodiode output is supplied to a signal processing system comprising an amplifier 16, a band-pass filter 17, a discriminator 18 and a counter 19.

Upon the flow of a fluid, for example, water, through the tube 5, vortex shedding occurs alternately from opposite sides of the sensing element 1. This induces an approximately simple harmonic oscillating strain of amplitude $a(v)$ in the sensing element, which vibrates in opposite directions normal to its axis. The strain amplitude is a function of the flow velocity v. It produces an optical phase of modulation amplitude $\Delta\phi(v)$ in the beam guided in the fibre 2 and, hence, modulates the photodetector output I. The vortex shedding frequency f is determined from the frequency spectrum of I, which comprises harmonics of a fundamental frequency 2f. The distribution of power amongst the harmonics is determined by $\Delta\phi(v)$ which may hence be derived.

In the embodiment shown in FIG. 1, the vortex shedding frequency f is determined by using a simple counting system which provides a practical and inexpensive signal processing system. The output from the photodiode 14 is amplified at 16 and then fed to the band-pass filter 17. The discriminator 18 and counter 19 are used to determine the number of positive-going transitions through the discriminator level per unit time f. The number of counts recorded per sensing element oscillation is 2n, where n may take either of the integral values in the range $$[\Delta\phi(v)/2\pi - 1] < n(v) \leq [\Delta\phi(v)/2\pi + 1]$$

depending on the equilibrium operating point of the interferometer 3 and the discriminator level set. The operating point of the interferometer drifts randomly due to environmentally induced phase changes, arising chiefly from thermal effects. By using sufficient counting time, for example of a few seconds, frequencies which depend on the time-averaged value $<n(v)>$, are obtained and which are substantially independent of the instantaneous operating point of the interferometer. The functional dependence $<n(v)>$ is determined by calibration. The vortex shedding frequency and, hence, the flow velocity are thus determined.

Utilising the above flowmeter, tests have been carried out on three flow tubes 5 of 0.4 m in length and with internal diameters of 20, 10 and 6.5 mm, respectively, to achieve a large range of Reynolds number. A single mode optical fibre sensing element 1 was positioned along a diameter at the centre of each tube 5 to avoid end effects. Vortex shedding induced an oscillating strain whose amplitude $a(v)$ is a function of the flow velocity v. This oscillating strain produced an optical phase of modulation amplitude $\Delta\phi(v)$ in the beam guided in the fibre 2. The phase modulation was determined interferometrically using the construction described above. The water flow through the tube was driven by an impeller pump (volume rate up to 1 l/s) which was vibration isolated from the flow tube using flexible tubing to minimise vibration and the propagation of pressure waves from the pump. Further damping was provided by a large reservoir between the pump and the inlet tube. Interferometric measurements were employed to check the contribution of possible mechanical and hydraulic vibrations and these were found to be negligible. No signal was observed at the frequency of the pump (equal to the pump rotational frequency multiplied by the number of impellers).

Figure 2:
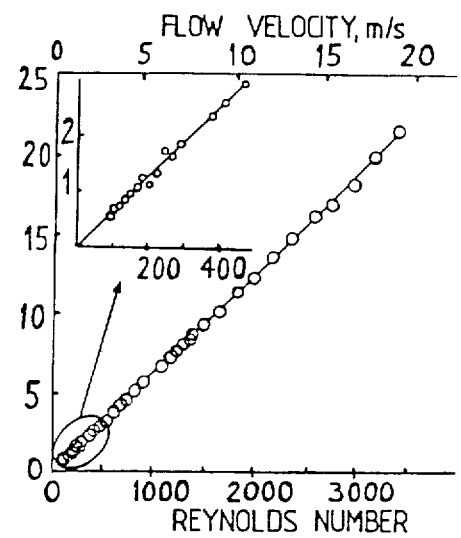
FIG. 2 is a graph illustrating results achieved with the embodiment of FIG. 1, FIG. 3 diagrammatically illustrates a second embodiment based on an all-fibre Michelson interferometer.

The functional dependence $<n(v)>$ was derived from experimental data provided by the above tests for the variation of f with v and was confirmed by measuring f as a function of v directly using a spectrum analyser. Theoretical considerations had predicted strain amplitudes up to $10\lambda$ and these were observed. The calibration was highly reproducible and stable and permitted the determination of f over a wide range of Reynolds number, as shown in FIG. 2, which compiles data obtained from all three flow tubes; these data are consistent with the relationship $f=sv/d$ using $s=0.2$. The time-averaging technique also allowed operation in the lower transition range, into which the data shown in FIG. 2 extend.

Figure 3:
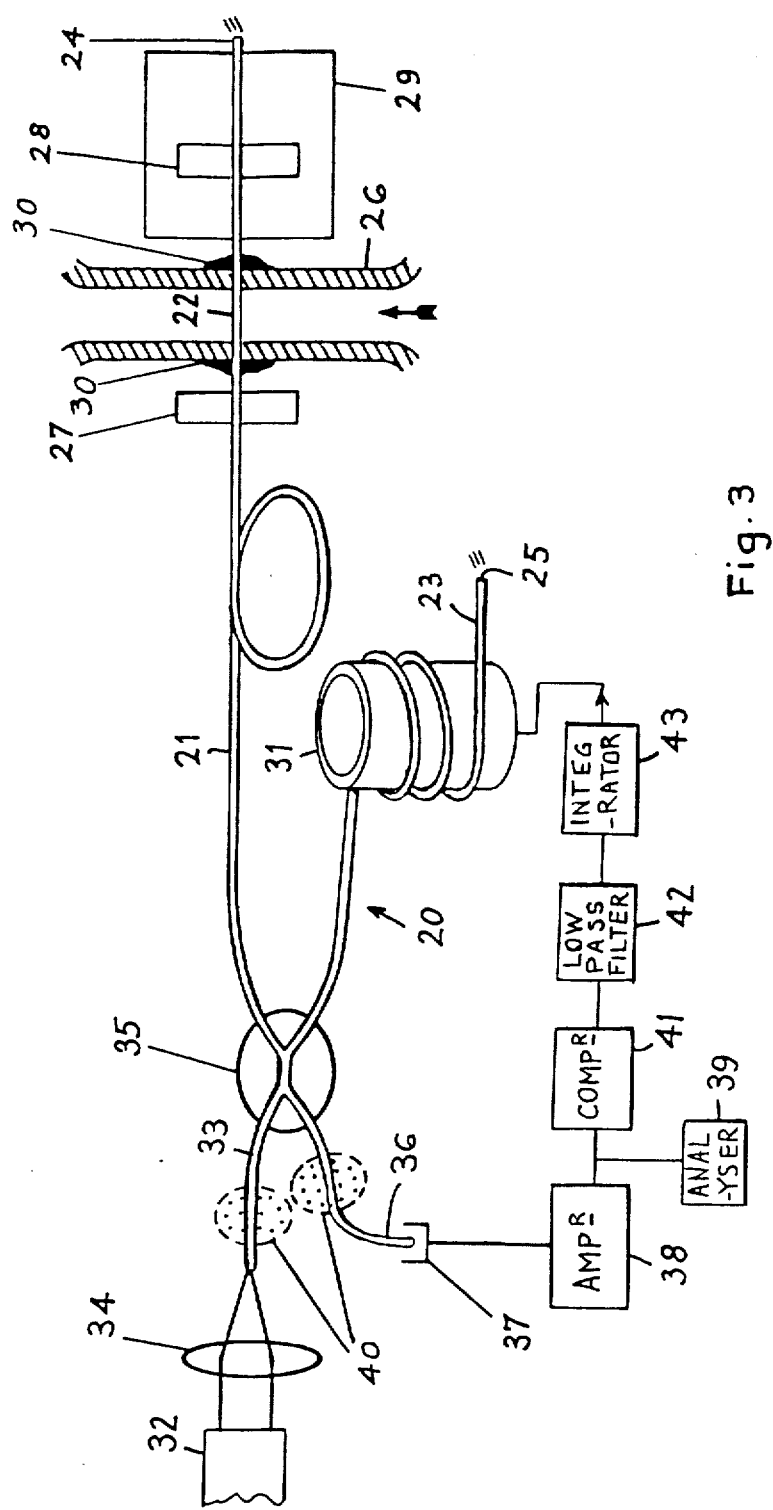

The embodiment illustrated in FIG. 3 is based on an all-fibre Michelson interferometer 20. The latter comprises a single mode optical fibre signal arm 21, a part of which forms the sensing element 22, and a single mode optical fibre reference arm 23. The distal end faces 24,25 of both fibre arms are silvered. The sensing element 22 is mounted, under tension, diametrically across the flow tube 26, in a similar manner to the optical fibre of FIG. 1 by clamps 27,28, a tensioning element 29 and flexible filler material 30. The fibre reference arm 23 is coiled about an electrical piezoelectric crystal 31 excited by a servo system which is hereinafter more fully described and is arranged to compensate for differential phase drifts between the interferometer arms 21, 23 caused by environmental perturbations, such as, temperature fluctuations.

Light from a coherent light source 32, for example, a multimode helium-neon laser, is launched into a single mode input fibre 33 of the interferometer, via a lens 34, and is amplitude divided by a single mode bidirectional fusion coupler 35 into the interferometer signal and reference arms 21,23. The light beams guided in the two arms are reflected from the distal ends 24,25 thereof and the returning beams are mixed by the fusion coupler 35 and guided by a single mode output fibre to a photodiode detector 37 which senses the resulting intereference signal and produces an electrical output signal which is fed, via an amplifier 38, to a homodyne signal processing system comprising a spectrum analyser 39. Mode strippers 40 may be associated with the input and output fibres 33, 36.

The embodiment described with reference to FIG. 1 uses time-averaging techniques in order to compensate for environmentally induced drift of the interferometer operating point. This limits the response time of the flowmeter. To alleviate this drawback, the embodiment of FIG. 3 employs an active homodyne signal processing system which maintains the interferometer at a constant operating point, normally, in quadrature. This system is capable of detecting much smaller phase changes, so extending the dynamic range of the flowmeter. Moreover, whilst described in conjunction with a Michelson configuration, the system employed in the embodiment of FIG. 3 is equally applicable to flowmeters embodying Fabry-Perot, Mach-Zehnder and Polarimetric configurations.

The compensating circuit illustrated in FIG. 3 is fully described in a paper by D. A. Jackson entitled "Elimination of drift in a single mode optical fibre interferometer using a piezoelectrically stretched coiled fibre" published in Applied Optics, Volume 19, 1980 at page 2926, and it will not therefore be described hereafter in detail.

Briefly, it comprises a comparator 41, a low pass filter 42 and an integrator 43, including a high voltage amplifier, and produces an error signal which is proportional to the drift of the interferometer operating point and which is used to excite the piezoelectric crystal 31 so as to strain the reference arm 23 in such a manner as to compensate for the drift. With the interferometer operating at quadrature, the vortex shedding signal is monitored by analysing the frequency spectrum of the photodiode 37 output. The interferometer irradiance is given by $$I = A\{1 + \cos[\phi_d + \phi_m \sin(\omega t)]\}$$

where $\phi d$ is the quasi-static phase difference, $\phi_m$ is the amplitude of the phase change induced by the vortex shedding, $\omega = 2\pi f$ and A is a constant.

When operating at quadrature, the interferometer irradiance can be written in terms of the Bessel functions $J_n(\phi_m)$ as $$I = A\left(1 - 2 \sum_{n=o}^{\infty} J_{2n-1}(\phi_m) \sin[(2n-1)\omega t]\right).$$

Clearly only the odd harmonics contribute. The maximum vortex-shedding induced phase change is measured to be about 1 rad which means the contribution from the fundamental component dominates with the ratio $J_3/J_1 \leq 5$ percent in most cases.

Figure 5D:
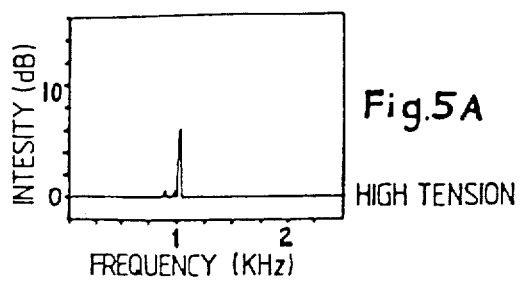
Figure 5D:
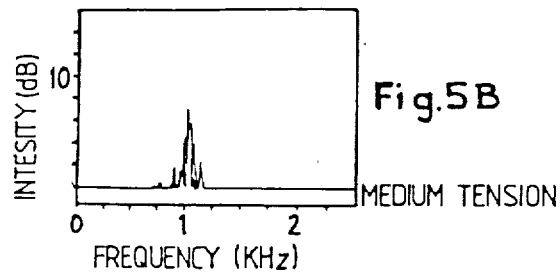
Figure 5D:
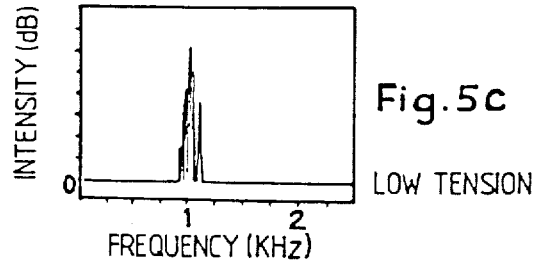
Figure 5D:
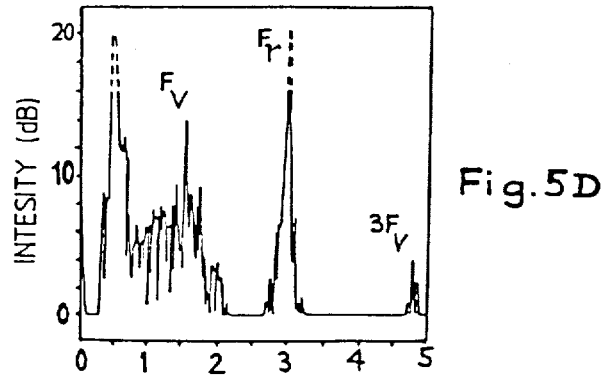

FIGS. 5A to 5D show the frequency spectra of typical recorded vortex shedding signals utilizing the active homodyne detection system described above, with small strain amplitudes. The three sets of spectra of FIGS. 5A, B and C relate to the same flow velocity but were obtained with different applied tensions in the fibre sensing element 22. The effect of reducing the tension in the fibre and, hence, increasing the strain amplitude induced by vortex shedding, is an increase in the recorded vortex-shedding signal amplitude accompanied by spectral broadening. Reducing the tension further, causes the excitation of the fibre resonant frequency for transverse oscillations, as can be seen in FIG. 5D. Because of the increased oscillating strain amplitude the expected third harmonic of the vortex shedding frequency can also be seen.

When the vortices are shed parallel and normal to the axis of the fibre sensing element, the shedding occurs in-phase resulting in a sharply peaked signal, as in the high tension case (FIG. 5A). However, when they are shed from a curved body, such as a slack fibre which has bowed due to the water flow, anharmonic shedding and the resulting phase difference effects give rise to signals showing an increased noise level.

Figure 4:
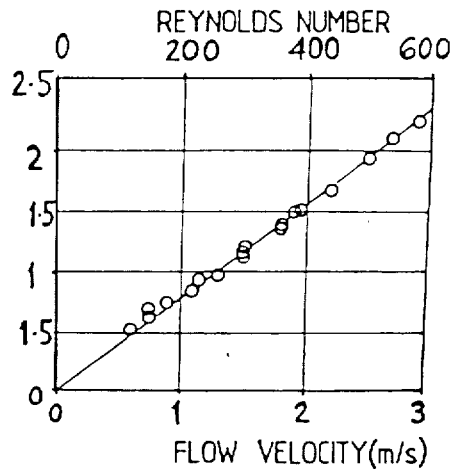
FIG. 4 is a graph illustrating the results achieved with the embodiment of FIG. 3, and FIGS. 5A-D illustrate typical recorded vortex shedding signals for the homodyne detection system of FIG. 3 and show the effect of reducing the tension in the optical fibre sensing element.

Data compiled for the flowmeter of FIG. 3 by conducting tests on three flow tubes of the same dimensions and under the same conditions as the flow tubes used to obtain the test results for the flowmeter of FIG. 1 are shown in the graph of FIG. 4. The recorded vortex shedding frequency variation with flow velocity was linear and the conformity of the data in the normal operating range was better than 2%. The graphically calculated value of the Strouhal number (given by the slope of the graph) agrees with its expected value for the Reynolds number range considered. The Strouhal number varies continuously from about 0.12–0.19 when the Reynolds number increases from about 60–600 for a smooth cylinder. However, the roughness of the body has a stabilising effect on the Strouhal number. The FIG. 3 embodiment was successively operated in the lower transition region. Irregularity in this region arises from instability of the vortex street to the three-dimensional disturbances. However, since the vortices are detected on the sensing element at the instance of the shedding, the recorded signals are clear.

Whilst particular embodiments have been described, it will be understood that modifications can be made without departing from the scope of the invention as defined by the appended claims. For example, the fibre sensing element 1 or 22 may be exposed directly to the flow or may be bonded to or mounted within a suitable bluff body which has some flexibility and which serves as a protective shield for the fibre. Moreover, the beam splitter 10 shown in FIG. 1 may be replaced by an optical fibre directional coupler to produce a functionally identical system.

We claim:

1. In a flowmeter for monitoring the vortex shedding frequency of a fluid flow, said flowmeter comprising a tensioned optical fiber sensing element arranged to extend transversely to the fluid flow so as to oscillate in response to vortex shedding, a light source for illuminating the optical fiber, and a photodetector for sensing an output of the fiber sensing element and producing an electrical signal corresponding to the vortex shedding frequency, the improvement wherein said sensing element comprises at least part of a single mode optical fiber forming a signal arm of an interferometer which also includes means for deriving a reference signal from the illuminating light source, said interferometer producing an interference signal which corresponds to the optical phase difference between the signal light beam and the reference signal and which is modulated by oscillation of the sensing element in response to vortex shedding, and said photodetector being arranged to sense the modulated interference signal and produce an electrical signal having a modulation frequency corresponding to the vortex shedding frequency.

2. A flowmeter according to claim 1, wherein the optical fibre signal arm has said part thereof forming the sensing element under tension and extending transversely through a flow channel for guiding the fluid flow about the sensing element.

3. A flowmeter according to claim 1, wherein the interferometer has a Fabry-Perot configuration in which the optical fibre signal arm has reflective input and distal ends, whereby the light source propagates a signal light beam within the signal arm which is reflected from the distal end thereof for mixing with a reference signal reflected from the input end of the signal arm and producing the interference signal.

4. A flowmeter according to claim 1, wherein the interferometer has a Michelson configuration and comprises separate single mode optical fibre signal and reference arms having reflective distal ends, and means at the input ends of the fibre arms for launching the light from the light source into the arms and for mixing the reflected light beams propagated in the arms to produce the interference signal.

5. A flowmeter according to claim 4, wherein the mixing means comprises a bi-directional coupler, the light from the light source is arranged to be launched into the two arms of the interferometer by an input optical fibre coupled to the input of the bi-directional coupler, and the interference signal at the output of the coupler is guided to the photodetector by an output optical fibre.

6. A flowmeter according to claim 1, further comprising signal processing means for monitoring the output of the photodetector and producing an output signal identifying the vortex shedding frequency, said processing means including counting means which counts the number of transitions in the photodetector output signal through an adjustable discriminator level.

7. A flowmeter according to claim 1, further comprising signal processing means for monitoring the output of the photodetector and producing a signal identifying the vortex shedding frequency, said processing means being a homodyne signal processing means for maintaining the interferometer at a constant operating point.

8. A flowmeter according to claim 7, wherein the processing means includes compensating circuit means for producing an error signal proportional to the drift of the interferometer operating point, and means responsive to the error signal for adjusting the reference signal to compensate for the drift of said operating point.

9. A flowmeter according to claim 8, wherein the reference signal is propagated in an optical fibre reference arm of the interferometer and the means responsive to the error signal for adjusting the reference signal is arranged to adjust the strain applied to the reference arm.

* * * * *

UNITED STATES PATENT AND TRADEMARK OFFICE
CERTIFICATE OF CORRECTION

PATENT NO. : 4,706,502

DATED : November 17, 1987

INVENTOR(S) : Julian David Clayton Jones, et al

It is certified that error appears in the above-identified patent and that said Letters Patent is hereby corrected as shown below:

Column 1, line 30, "sheet" should be -- street --.

Column 1, line 56, "sheet" should be -- street --.

Column 4, line 32, "$/2\pi+1]$" should be -- $/2\pi-1]$ --.

Column 5, line 15, "range" should be -- region --.

Signed and Sealed this

Fifth Day of July, 1988

Attest:

DONALD J. QUIGG

Attesting Officer

Commissioner of Patents and Trademarks